M. BEEBEE.
MOTOR BOAT.
APPLICATION FILED APR. 15, 1922.

1,431,924. Patented Oct. 17, 1922.

Martin Beebee
INVENTOR

BY Geo. B. Willcox
ATTORNEY

Patented Oct. 17, 1922.

1,431,924

UNITED STATES PATENT OFFICE.

MARTIN BEEBEE, OF MARINE CITY, MICHIGAN, ASSIGNOR TO SYDNEY C. McLOUTH, OF MARINE CITY, MICHIGAN.

MOTOR BOAT.

Application filed April 15, 1922. Serial No. 553,209.

*To all whom it may concern:*

Be it known that I, MARTIN BEEBEE, a citizen of the United States, residing at Marine City, in the county of St. Clair and State of Michigan, have invented certain new and useful Improvements in Motor Boats; and I do hereby declare the following to be a full, clear, and exact description of the invention, such as will enable others skilled in the art to which it appertains to make and use the same.

This invention relates to motor boats and pertains more particularly to small boats, such as rowboats equipped with motors and propellers.

My improvement consists in an improved arrangement of the rear seat and fantail cover with relation to the motor and propeller shaft, whereby the back of the seat and the hatch cover of the fantail co-operate to provide a closed cockpit or housing for the engine when the seat and hatch cover are in place. The seat and hatch cover are, however, adapted to be disconnected and separated by folding or otherwise to thereby expose the entire engine and propeller shaft, rendering them fully accessible for adjustment, oiling or repair.

I accomplish the above objects by an arrangement of the hatch cover, rear seat and engine that is compact, yet convenient to operate.

When the engine is housed, as above described, it is concealed from view, its noise is muffled and the entire width of the rear seat is available for use as a seat, unobstructed by the engine.

The engine is so located with regard to the stern seat that the engine controls can be conveniently brought through the back of the seat, to eliminate opening the motor housing when it is desired to change speed, or otherwise alter the operation of the motor.

With the foregoing and certain other objects in view which will appear later in the specification, my invention comprises the devices described and claimed and the equivalents thereof.

In the drawings, Fig. 1 is a top plan view of the rear of a motor-equipped rowboat, the hatch cover in the fantail removed and showing the engine.

Figure 1:
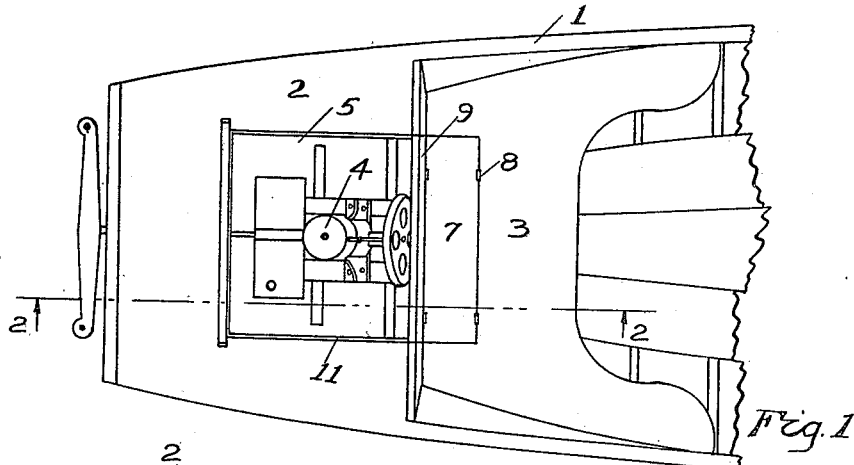

As is clearly shown in the drawings, 1 indicates the hull of the boat, 2 the fantail cover and 3 the rear seat. 4 is a motor, which may be of the internal combustion type. The motor 4 is mounted, as shown, as close as possible to the stern of the boat and aft of the rear seat 3.

The fantail is covered by the deck 2 having a hatchway 5 fitted with a suitable movable hatch cover 6.

Figure 3:
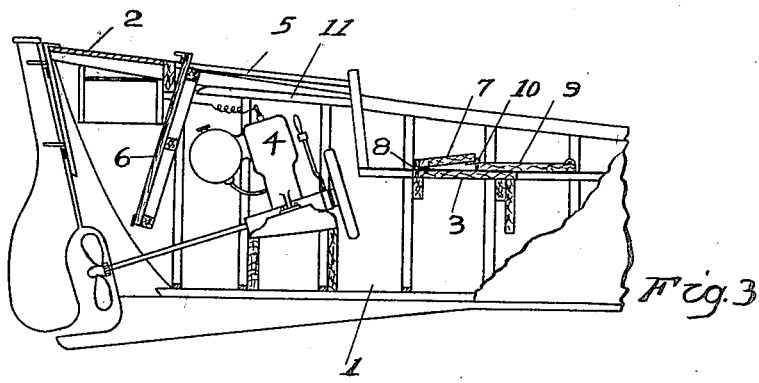
Fig. 3 is a similar view, showing the seat and hatch cover open.

The rear part 7 of the seat 3 is movable, as for example, by being hinged transversely, as at 8, so that it may be folded forward upon the seat 3, as shown in Fig. 3. The seat back 9 is removable, being preferably hinged, as at 10 to the seat member 7, and is adapted to fold forward upon the seat 3, as shown in Fig. 3.

The movable hatch cover 6 is preferably supported at its side edges by a pair of horizontal strips or guides 11 which extend from the back 9 of the seat nearly to the aft edge of the hatchway 5, so that when the forward end of the hatch cover 6 is lifted its rear end may be tilted downwardly and the hatch cover may be dropped down past the rear ends of the guides, as shown in Fig. 3, into the fantail space back of the motor 4. The hatch cover may be otherwise movably supported, if desired, so as to be lifted up for inspection of the motor. The operator using seat 3 as a support, may then conveniently make repairs or adjustments to any part of the engine, all of which is fully exposed to view and easily accessible.

Figure 2:
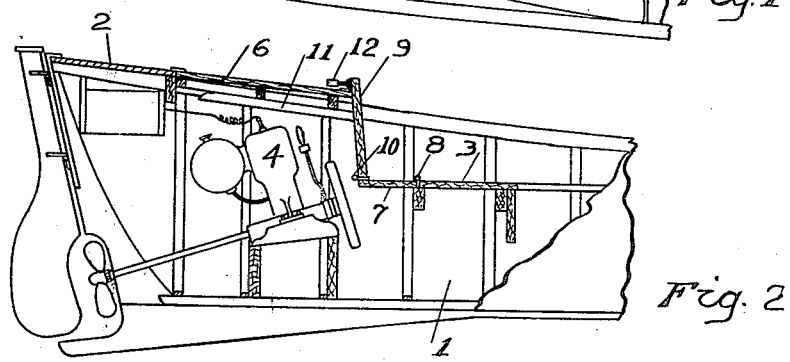
Fig. 2 is a longitudinal section on the line 2—2 of Fig. 1, the seat and hatch cover closed.

By returning the seat members 7 and 9 to their original positions, as shown in Fig. 2, and replacing the cover 6 the whole may be fastened together by a suitable hasp and lock 12, or the equivalent, uniting the upper edge of the seat-back with the forward edge of the removable hatch cover 6.

By the means above described, I have produced a simple, inexpensive, yet compact arrangement of the rear seat, fantail deck and motor whereby the motor is made readily accessible, and when the seat-back and hatch cover are closed and fastened, the motor-equipped boat presents the appearance of an ordinary rowboat with all of the usual seating capacity unobstructed.

Having thus described my invention, what I claim and desire to secure by Letters Patent is:

1. In a boat, a covered stern formed with a hatchway having a movable cover, a transverse seat having a hinged section, a seat back hinged to said section, the upper end of said back adapted to be releasably secured to the forward end of said movable hatch cover, said seat, back and cover when closed forming a closed fantail motor compartment, for the purposes set forth.

2. In a boat, a covered stern formed with a hatchway, a movable hatch cover, supporting guides for said cover, said seat having a transverse hinged rear section, a back member hinged to the rear edge of said section, the upper end of said back member releasably engaging the forward end of said cover, said seat, back and cover when closed forming a closed motor compartment.

3. In a boat, a covered stern formed with a hatchway having a removable cover, a transverse seat having a back section thereof movable, a seat back movable with respect to said seat, the upper end of said back adapted to be releasably secured to the forward end of said movable hatch cover, said seat, back and cover when closed forming a closed motor compartment.

In testimony whereof, I affix my signature in presence of two witnesses.

MARTIN BEEBEE.

Witnesses:
H. W. MILLER,
W. W. DENSMORE.